US012508804B2

(12) United States Patent
Toshima

(10) Patent No.: US 12,508,804 B2
(45) Date of Patent: Dec. 30, 2025

(54) PRINTING DEVICE AND PRINTING METHOD

(71) Applicant: SEIKO EPSON CORPORATION, Tokyo (JP)

(72) Inventor: Kazuya Toshima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 246 days.

(21) Appl. No.: 18/534,781

(22) Filed: Dec. 11, 2023

(65) Prior Publication Data

US 2024/0190127 A1 Jun. 13, 2024

(30) Foreign Application Priority Data

Dec. 13, 2022 (JP) ................................ 2022-198760

(51) Int. Cl.
*B41J 2/045* (2006.01)

(52) U.S. Cl.
CPC ......... *B41J 2/0451* (2013.01); *B41J 2/04581* (2013.01)

(58) Field of Classification Search
CPC ...... B41J 2/2139; B41J 2/0451; B41J 2/2142; B41J 2/16579; G09G 2330/10
See application file for complete search history.

(56) References Cited

U.S. PATENT DOCUMENTS 6,565,180 B2 * 5/2003 Yu .......................... B41J 2/2142 347/14
9,434,176 B1 * 9/2016 Kroon .................... B41J 2/2146
11,691,437 B2 * 7/2023 Billow ................... B41J 2/2139 347/47
2007/0070111 A1 * 3/2007 Vladislav ............... B41J 2/2139 347/19
2008/0266345 A1 * 10/2008 Onodera ................ B41J 2/2139 347/14
2015/0283804 A1 10/2015 Sato et al.
2020/0298571 A1 * 9/2020 Honda ...................... B41J 2/145
2022/0314636 A1 * 10/2022 Kobayashi ............. B41J 2/2142

FOREIGN PATENT DOCUMENTS

JP 2015-196340 A 11/2015

* cited by examiner

*Primary Examiner* — John P Zimmermann
(74) *Attorney, Agent, or Firm* — Global IP Counselors, LLP

(57) ABSTRACT

A dot to be discharged by a first defective nozzle and a dot to be discharged by a second defective nozzle are determined to be adjacent to each other in a sub-scanning direction, the printing device replaces the position of the dot to be discharged by the first defective nozzle in a main scanning direction with the position of the dot to be discharged by the first normal nozzle in the main scanning direction and then converts the size of a dot adjacent in the sub-scanning direction to the dot to be discharged by the first defective nozzle or the dot to be discharged by the second defective nozzle into a larger size.

5 Claims, 9 Drawing Sheets

| PASS NUMBER | 1 | 2 | 3 | 4 | 5 | 6 | 7 | 8 |
|---|---|---|---|---|---|---|---|---|
| PAPER FEED AMOUNT | 603 | 10 | 11 | 10 | 11 | 10 | 11 | 10 |
| PIXEL POSITION | 1 | 2 | 2 | 1 | 1 | 2 | 2 | 1 |

D1 →

D2 ↑

| RASTER NUMBER | | | | | | | | |
|---|---|---|---|---|---|---|---|---|
| #30 | | | 26 | | | | | 13 |
| #31 | | 29 | | | 21 | | | |
| #32 | | | | 24 | | | 16 | |
| #33 | 32 | | | | | 19 | | |
| #34 | | | 27 | | | | | 14 |
| #35 | | 30 | | | 22 | | | |
| #36 | | | | 25 | | | 17 | |
| #37 | 33 | | | | | 20 | | |
| #38 | | | 28 | | | | | 15 |
| #39 | | 31 | | | 23 | | | |
| #40 | | | | 26 | | | 18 | |
| #41 | 34 | | | | | 21 | | |
| #42 | | | 29 | | | | | 16 |
| #43 | | 32 | | | 24 | | | |
| #44 | | | | 27 | | | 19 | |
| #45 | 35 | | | | | 22 | | |
| #46 | | | 30 | | | | | 17 |
| #47 | | 33 | | | 25 | | | |
| #48 | | | | 28 | | | 20 | |
| #49 | 36 | | | | | 23 | | |
| #50 | | | 31 | | | | | 18 |
| #51 | | 34 | | | 26 | | | |
| #52 | | | | 29 | | | 21 | |
| #53 | 37 | | | | | 24 | | |
| #54 | | | 32 | | | | | 19 |
| #55 | | 35 | | | 27 | | | |
| #56 | | | | 30 | | | 22 | |
| #57 | 38 | | | | | 25 | | |
| #58 | | | 33 | | | | | 20 |
| #59 | | 36 | | | 28 | | | |
| #60 | | | | 31 | | | 23 | |
| #61 | 39 | | | | | 26 | | |
| #62 | | | 34 | | | | | 21 |
| #63 | | 37 | | | 29 | | | |
| #64 | | | | 32 | | | 24 | |
| #65 | 40 | | | | | 27 | | |

FIG. 4

PRINTING DEVICE AND PRINTING METHOD

The present application is based on, and claims priority from JP Application Serial Number 2022-198760, filed Dec. 13, 2022, the disclosure of which is hereby incorporated by reference herein in its entirety.

BACKGROUND

1. Technical Field

The present disclosure relates to a printing device and a printing method.

2. Related Art

In an ink-jet printer, when ink thickens in a nozzle included in a printing head or air bubbles, dust, or the like enter the nozzle, clogging occurs in the nozzle, and such a nozzle becomes a so-called defective nozzle which cannot discharge ink dots normally. The defective nozzle is also referred to as an abnormal nozzle. The defective nozzle causes missing dots to be formed in a print result.

As a related technique, there is disclosed a recording device including a plurality of complementing units that form complementing dots for complementing dots to be formed by a defective nozzle, and a selection unit that selects any one complementing unit from the plurality of complementing units (see JP-A-2015-196340).

Of raster lines having length components in a main scanning direction of a printing head, one raster line formed using a plurality of nozzles including a defective nozzle is referred to as a defective raster line. In the defective raster line, dots assigned to the defective nozzle are missing from a print result. Missing of the dots may sometimes be substantially eliminated by making the missing dots inconspicuous using so-called neighborhood complementation of increasing an amount of ink discharged from another nozzle capable of discharging dots at positions near the missing dots.

However, when defective raster lines are continuously generated, missing of dots in a print result may not always be resolved appropriately by simply executing the neighborhood complementation. In view of such circumstances, there is a need for an improvement to prevent deterioration of print quality due to defective nozzles.

SUMMARY

Provided is a printing device including: a printing head including a nozzle row in which a plurality of nozzles each configured to discharge a dot of liquid to a medium are arranged in a sub-scanning direction, the printing head being configured to discharge the dot while moving in a main scanning direction intersecting the sub-scanning direction, a storage unit configured to store information about defective nozzles of the plurality of nozzles forming the nozzle row, and a control unit configured to control the printing head, wherein of raster lines having a length component in the main scanning direction, the raster line formed at the medium using two or more nozzles of the plurality of nozzles, the two or more nozzles including a first defective nozzle that is one of the defective nozzles and a first normal nozzle that is one of normal nozzles, the normal nozzles being included in the plurality of nozzles and not corresponding to the defective nozzles, is defined as a first raster line, the raster line formed at the medium using two or more nozzles of the plurality of nozzles, the two or more nozzles including a second defective nozzle that is one of the defective nozzles and a second normal nozzle that is one of the normal nozzles, is defined as a second raster line, and when the dot to be discharged by the first defective nozzle and the dot to be discharged by the second defective nozzle are determined to be adjacent to each other in the sub-scanning direction, the control unit performs first control of executing either control of replacing a position of the dot to be discharged by the first defective nozzle in the main scanning direction with a position of the dot to be discharged by the first normal nozzle in the main scanning direction and then converting a size of the dot adjacent in the sub-scanning direction to the dot to be discharged by the first defective nozzle or the dot to be discharged by the second defective nozzle into a larger size, or control of replacing a position of the dot to be discharged by the second defective nozzle in the main scanning direction with a position of the dot to be discharged by the second normal nozzle in the main scanning direction and then converting the size of the dot adjacent in the sub-scanning direction to the dot to be discharged by the first defective nozzle or the dot to be discharged by the second defective nozzle into a larger size.

Provided is a printing method including performing printing by controlling a printing head including a nozzle row in which a plurality of nozzles each configured to discharge a dot of liquid to a medium are arranged in a sub-scanning direction, the printing head being configured to discharge the dot while moving in a main scanning direction intersecting the sub-scanning direction, wherein of raster lines having a length component in the main scanning direction, the raster line formed at the medium using two or more nozzles of the plurality of nozzles, the two or more nozzles including a first defective nozzle that is one of defective nozzles of the plurality of nozzles forming the nozzle row and a first normal nozzle that is one of normal nozzles, the normal nozzles being included in the nozzles and not corresponding to the defective nozzles, is defined as a first raster line, the raster line formed at the medium using two or more nozzles of the plurality of nozzles, the two or more nozzles including a second defective nozzle that is one of the defective nozzles and a second normal nozzle that is one of the normal nozzles, is defined as a second raster line, and in the printing, when the dot to be discharged by the first defective nozzle and the dot to be discharged by the second defective nozzle are determined to be adjacent to each other in the sub-scanning direction, first control of executing either control of replacing a position of the dot to be discharged by the first defective nozzle in the main scanning direction with a position of the dot to be discharged by the first normal nozzle in the main scanning direction and then converting a size of the dot adjacent in the sub-scanning direction to the dot to be discharged by the first defective nozzle or the dot to be discharged by the second defective nozzle into a larger size, or control of replacing a position of the dot to be discharged by the second defective nozzle in the main scanning direction with a position of the dot to be discharged by the second normal nozzle in the main scanning direction and then converting the size of the dot adjacent in the sub-scanning direction to the dot to be discharged by the first defective nozzle or the dot to be discharged by the second defective nozzle into a larger size is performed.

BRIEF DESCRIPTION OF THE DRAWINGS

FIG. 4 is a diagram for describing a printing rule.

DESCRIPTION OF EMBODIMENTS

Embodiments of the present disclosure will be described below with reference to the drawings. Also, each figure is merely illustrative for describing the present embodiment. Since each figure is illustrative, they may not show exact proportions or shapes, may not match each other, or may be partially omitted.

1. Device Configuration

Figure 1:
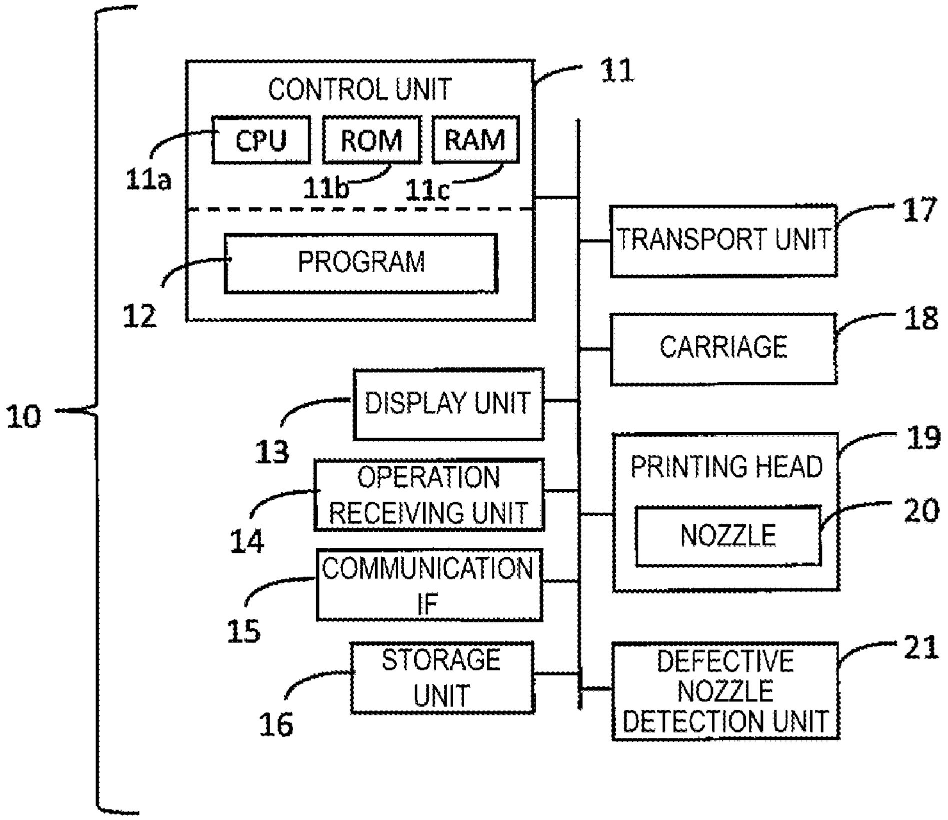
FIG. 1 is a block diagram simply illustrating a device configuration.

FIG. 1 simply illustrates a configuration of a printing device 10 according to the present embodiment. The printing device 10 includes a control unit 11, a display unit 13, an operation receiving unit 14, a communication IF 15, a storage unit 16, a transport unit 17, a carriage 18, a printing head 19, a defective nozzle detection unit 21, and the like. IF is an abbreviation for interface. The control unit 11 is configured by including one or a plurality of ICs each having a CPU 11*a* as a processor, a ROM 11*b*, a RAM 11*c*, and the like, other non-volatile memories, and the like.

In the control unit 11, the processor, that is, the CPU 11*a*, executes arithmetic processing according to one or more programs 12 stored in the ROM 11*b*, other memories, or the like using the RAM 11*c* or the like serving as a work area, thereby controlling the printing device 10. Also, the processor is not limited to a single CPU, and a configuration in which the processing is performed by a hardware circuit such as a plurality of CPUs, an ASIC, or the like may be adopted, or a configuration in which a CPU and a hardware circuit cooperate to perform the processing may be adopted.

The display unit 13 is a unit that displays visual information and is constituted by, for example, a liquid crystal display, an organic EL display, or the like. The display unit 13 may have a configuration including a display and a drive circuit for driving the display. The operation receiving unit 14 is a unit that receives an operation performed by a user and is realized by, for example, a physical button, a touch panel, a mouse, a keyboard, or the like. Of course, the touch panel may be realized as one function of the display unit 13.

The display unit 13 and the operation receiving unit 14 may be part of the configuration of the printing device 10, or may be peripheral devices externally attached to the printing device 10. "Communication IF 15" is a general term for one or a plurality of IFs for coupling the printing device 10 to an external device in a wired or wireless manner in accordance with a predetermined communication protocol including known communication standards.

The storage unit 16 is configured of, for example, a storage device such as a hard disk drive, or a solid state drive. The storage unit 16 may be one memory included in the control unit 11. The storage unit 16 may be understood as part of the control unit 11. The storage unit 16 stores various types of information required for controlling the printing device 10.

The transport unit 17 is a unit that transports a medium in a predetermined "transport direction", and includes rotating rollers and motors for rotating the rollers. Upstream and downstream in the transport direction are hereinafter simply referred to as upstream and downstream. The medium is typically paper, but in addition to paper, various materials that can be a target of printing with a liquid, such as fabrics and films, can be adopted as the medium. The transport direction is also referred to as a "sub-scanning direction".

The carriage 18 is a mechanism that can reciprocate in a predetermined "main scanning direction" by receiving power from a carriage motor (not illustrated). The main scanning direction and the sub-scanning direction intersect each other. The intersection between the main scanning direction and the sub-scanning direction may be understood as being orthogonal or substantially orthogonal. The printing head 19 is mounted on the carriage 18. Accordingly, the printing head 19 reciprocates in the main scanning direction together with the carriage 18. Movement of the printing head 19 and movement of the carriage 18 are synonymous. The carriage 18 and the printing head 19 may be collectively understood as a printing head.

The printing head 19 has a plurality of nozzles 20 for discharging liquid dots. The dots are droplets. In the following description, the liquid is assumed to be ink, but the printing head 19 can also discharge liquids other than ink. The printing head 19 discharges ink based on print data for printing an image generated by the control unit 11. As is known, the control unit 11 controls application of drive signals to drive elements (not illustrated) included in each of the nozzles 20 in accordance with the print data to cause each of the nozzles 20 to discharge or not to discharge the dots, thereby printing the image on the medium. The printing head 19 can discharge each color ink such as cyan (C) ink, magenta (M) ink, yellow (Y) ink, and black (K) ink. Of course, the ink discharged by the printing head 19 is not limited to CMYK.

Figure 2:
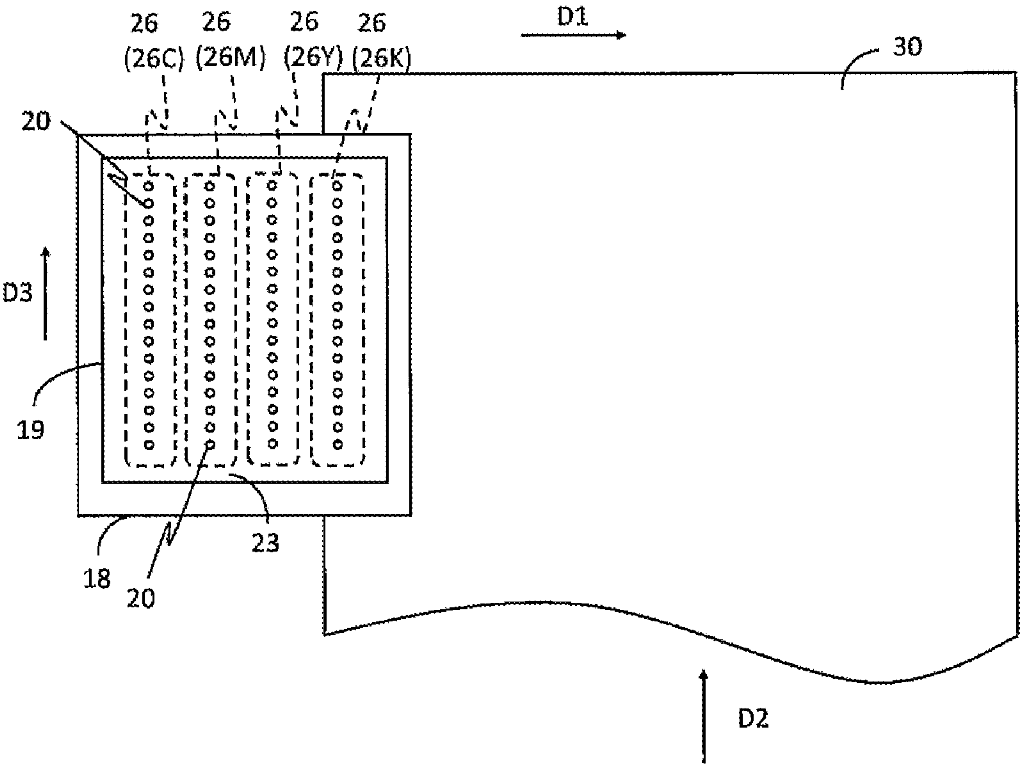
FIG. 2 is a diagram illustrating a relationship between a medium and a printing head from above.

FIG. 2 simply illustrates a relationship between a medium 30 and the printing head 19 from above. The printing head 19 mounted on the carriage 18 performs, together with the carriage 18, a forward movement that is a movement from one end to the other end in a main scanning direction D1 and a backward movement that is a movement from the other end to the one end. FIG. 2 illustrates an example of arrangement of the nozzles 20 on a nozzle surface 23. The nozzle surface 23 is a lower surface of the printing head 19 and is a surface facing the medium 30. Individual small circles in the nozzle surface 23 represent individual nozzles 20.

The printing head 19 includes nozzle rows 26 for each ink color in a configuration in which the printing head 19 receives supply of each color of ink from a liquid holding unit (not illustrated) referred to as ink cartridges, ink tanks, or the like and discharges them through the nozzles 20. FIG. 2 is an example of the printing head 19 that discharges CMYK inks. The nozzle row 26 including the nozzles 20 that discharge C ink is a nozzle row 26C. Similarly, the nozzle row 26 including the nozzles 20 that discharge M ink is a nozzle row 26M, the nozzle row 26 including the nozzles 20 that discharge Y ink is a nozzle row 26Y, and the nozzle row 26 including the nozzles 20 that discharge K ink is a nozzle row 26K.

In the example of FIG. 2, the nozzle rows 26C, 26M, 26Y, and 26K are arranged in the main scanning direction D1. Also, the plurality of nozzle rows 26 for each color are arranged at the same position in a sub-scanning direction D2. A nozzle row 26 corresponding to one color of ink is configured of a plurality of nozzles 20 having a constant or substantially constant "nozzle pitch", which is an interval between the nozzles 20 in the sub-scanning direction D2.

A direction in which the plurality of nozzles 20 forming the nozzle rows 26 are arranged is referred to as a "nozzle arranging direction D3". In the example of FIG. 2, the nozzle arranging direction D3 is parallel to the sub-scanning direction D2. Accordingly, it can be said that the plurality of nozzles 20 forming the nozzle rows 26 are arranged in the sub-scanning direction D2. In such a configuration, the nozzle arranging direction D3 is orthogonal to the main scanning direction D1. However, the nozzle arranging direction D3 may be oblique with respect to the sub-scanning direction D2 instead of parallel thereto. Regardless of whether the nozzle arranging direction D3 is parallel to the sub-scanning direction D2 or not, it can be said that the nozzle arranging direction D3 intersects the main scanning direction D1, and it can be said that the plurality of nozzles 20 forming the nozzle rows 26 are arranged at a predetermined nozzle pitch in the sub-scanning direction D2. Accordingly, in the present embodiment, even if the nozzle arranging direction D3 is oblique to the sub-scanning direction D2, the plurality of nozzles 20 forming the nozzle rows 26 may be understood to be arranged in the sub-scanning direction D2 as well.

An operation in which the printing head 19 discharges ink based on print data in accordance with movement of the carriage 18 in the main scanning direction D1 is referred to as "main scanning" or "pass". In addition, an operation in which the transport unit 17 transports the medium 30 by a predetermined distance between passes is referred to as "paper feeding". It can be said that the transport unit 17 performs relative movement between the medium 30 and the printing head 19 in the sub-scanning direction D2. By controlling the printing head 19, the carriage 18, and the transport unit 17 in this manner, the control unit 11 alternately repeats the pass and the paper feeding to print a two-dimensional image on the medium 30.

The configuration of the printing device 10 illustrated in FIG. 1 may be realized by one printer, or may be realized by a plurality of devices communicably coupled to each other. That is, the printing device 10 may be a printing system 10 in actuality. The printing system 10 includes, for example, a printing control device that functions as the control unit 11 and the storage unit 16, and a printer that has the transport unit 17, the carriage 18, the printing head 19, and the like. A printing method according to the present embodiment is realized by such a printing device 10 or printing system 10.

The defective nozzle detection unit 21 is a unit that detects "defective nozzles" from the plurality of nozzles 20 of the printing head 19. A defective nozzle is a nozzle 20 that is unable to discharge ink due to clogging or the like even though an ink discharging operation according to print data was performed. The inability to discharge ink includes, in addition to a state in which ink cannot be discharged at all, a case in which an amount of liquid discharged is too small, a case in which the discharged ink greatly bends and does not land on an intended location, and the like. A nozzle 20 that does not correspond to the defective nozzle is referred to as a "normal nozzle".

Detection of a defective nozzle by the defective nozzle detection unit 21 may be performed using any method, including known methods, as long as it is possible to determine and detect whether each nozzle 20 is a defective nozzle. The defective nozzle detection unit 21 adopts, for example, a laser method in which a light emitter and the printing head 19 are aligned such that laser light emitted from the light emitter and an ink flight path of a nozzle 20 serving as an inspection target intersect each other, and when a light receiver cannot detect blocking of the laser light by the dots discharged from the nozzle 20, the inspection target is determined to be a defective nozzle. In addition, the defective nozzle detection unit 21 may detect a defective nozzle using a method disclosed in JP-A-2013-126776. Specifically, it is detected whether ink is normally discharged from each nozzle 20 by measuring a waveform of residual vibration of a partial configuration of the printing head 19 such as a so-called diaphragm that bends in accordance with deformation of a drive element (piezoelectric element) due to application of drive signals corresponding to print data.

The defective nozzle detection unit 21 generates "defective nozzle information" describing whether each nozzle 20 is a defective nozzle or not by performing defective nozzle detection processing. The defective nozzle information is stored in the storage unit 16. A timing at which the defective nozzle detection unit 21 executes the defective nozzle detection processing is not particularly limited. The defective nozzle detection unit 21 can overwrite the defective nozzle information in the storage unit 16 with the latest defective nozzle information at any time.

2. Printing with First Control

Figure 3:
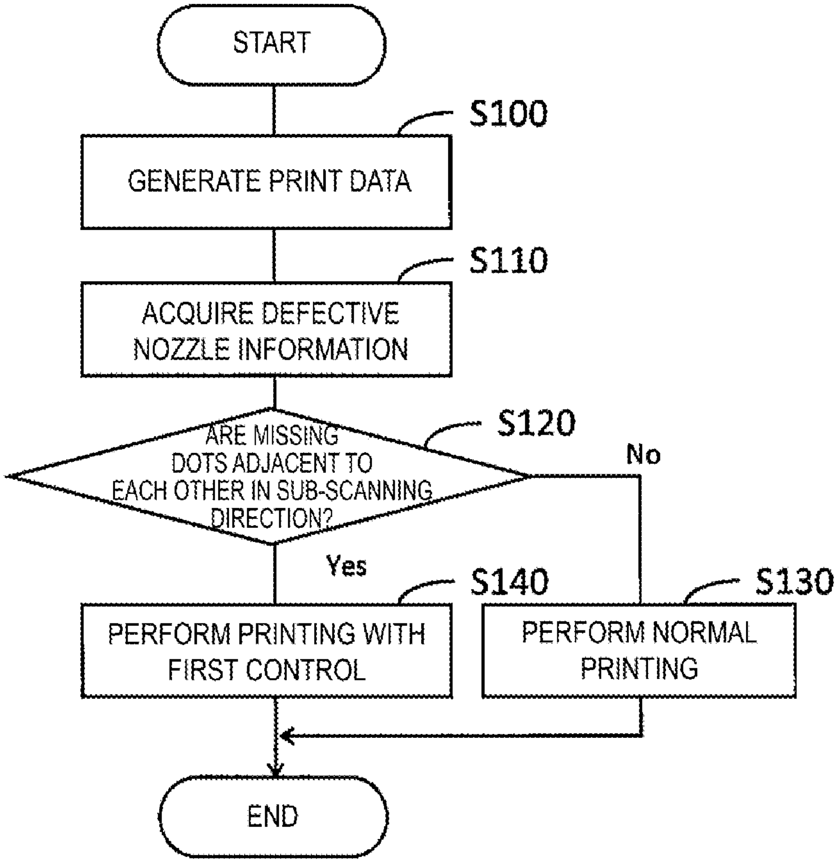
FIG. 3 is a flowchart illustrating processing according to the present embodiment.

FIG. 3 is a flowchart illustrating processing according to the present embodiment executed by the control unit 11 in accordance with the program 12. At least a part of the flowchart represents a "printing step".

In step S100, the control unit 11 generates print data. The control unit 11 acquires image data representing an image serving as a printing target from a predetermined acquisition source such as the storage unit 16 or an external device in accordance with the user's operation. Then, various types of image processing such as resolution conversion processing, color conversion processing, and halftone processing are appropriately performed on the image data to generate the print data. The print data here is assumed to be data that defines discharge or non-discharge of dots for each pixel and for each CMYK ink color. Discharge of the dots is also referred to as dot-on, and non-discharge of the dots is also referred to as dot-off.

As is known, the printing head 19 is configured to discharge dots having a plurality of sizes from the nozzles 20. A size of a dot is, for example, a volume per dot droplet. For example, the nozzles 20 are configured to discharge dots of three different sizes referred to as large dots, medium dots, and small dots. Naturally, the size relationship is large dots>medium dots>small dots. Accordingly, dot-on information in the print data is information further indicating any one of large dot-on, medium dot-on, and small dot-on. Of course, the sizes of the dots that can be discharged from the nozzles 20 may not be limited to three types.

In step S110, the control unit 11 acquires the defective nozzle information stored in the storage unit 16. Also, the order of executing steps S100 and S110 may be reversed, or they may be executed simultaneously.

In step S120, the control unit 11 determines whether the dots to be discharged by the defective nozzles are adjacent to each other in the sub-scanning direction D2 based on the defective nozzle information acquired in step S110 and a preset "printing rule" and causes the processing to branch to step S130 or step S140 depending on the determination results. The dots to be discharged by the defective nozzles, that is, the dots to be formed by the defective nozzles based on the print data are missing from a print result. Accordingly, the dots to be discharged by the defective nozzles are also referred to as "missing dots" in the sense that the dots are missing as a result. If it is determined that the missing dots are not adjacent to each other in the sub-scanning direction D2, the control unit 11 proceeds from "No" in step S120 to step S130, executes "normal printing", and ends the flowchart of FIG. 3. On the other hand, if it is determined that the missing dots are adjacent to each other in the sub-scanning direction D2, the control unit 11 proceeds from "Yes" in step S120 to step S140, executes "printing with the first control", and ends the flowchart of FIG. 3.

Steps S120, S130, and S140 will be described in detail below.

FIG. 4 is a diagram for explaining a specific example of the printing rule. Generally, the printing rule is a rule that defines an amount of paper feeding, a correspondence relationship between raster lines and the nozzles 20, and a correspondence relationship between the passes and pixel positions. In both steps S130 and S140, the control unit 11 basically controls the transport unit 17, the carriage 18, and the printing head 19 to execute the paper feeding in accordance with the printing rule, assigns data of each pixel in the print data to each nozzle 20 for each pass, and executes printing. In FIG. 4, each rectangle indicates each pixel forming the print data, and also indicates a correspondence relationship between some of the print data in which pixels gather and the directions D1 and D2. A line in which a plurality of pixels are arranged in the main scanning direction D1, that is, a line having a length component in the main scanning direction is a raster line. In FIG. 4, raster numbers are assigned in order for each raster line for easy understanding. Specifically, the raster numbers are assigned such that a downstream raster line has a smaller number, and FIG. 4 illustrates a total of 36 raster lines with raster numbers #30 to #65.

A pass number is a number assigned to each pass, and FIG. 4 illustrates 1 to 8 as pass numbers. That is, the pass numbers 1 to 8 are first to eighth passes when an image is printed based on print data. If the printing head 19 alternately executes passes of the forward movement and passes of the backward movement, each pass with odd pass numbers 1, 3, 5, 7, and so forth corresponds to the passes of the forward movement, and each pass with even pass numbers 2, 4, 6, 8, and so forth corresponds to the passes of the backward movement.

The numbers written in the pixels are the nozzle numbers of the nozzles 20 used for printing the raster line to which the pixels belong. The nozzle numbers are numbers sequentially assigned one by one to each nozzle 20 forming the nozzle row 26 corresponding to one color of ink, and similarly to the raster numbers, a smaller number is assigned to a downstream nozzle 20. Since the description of the present embodiment is common to each ink of CMYK, the following description will be continued assuming printing of one color, for example, C ink. According to FIG. 4, for example, it can be understood that the raster line with the raster number #30 is formed using the nozzle 20 with the nozzle number 26 in the third pass and the nozzle 20 with the nozzle number 13 in the eighth pass. Similarly, for example, the raster line with the raster number #31 is formed using the nozzle 20 with the nozzle number 29 in the second pass and the nozzle 20 with the nozzle number 21 in the fifth pass. Printing in which one raster line is formed using the plurality of nozzles 20 in this way is referred to as overlap printing.

In the example of FIG. 4, when the print data is viewed in the sub-scanning direction D2, the nozzle numbers are written at intervals of one pixel per four pixels. This means that a formation interval of pixels of the print data in the sub-scanning direction D2 is ¼ of the nozzle pitch in the nozzle rows 26. The amount of paper feeding illustrated in FIG. 4 is an amount of feeding in the paper feeding immediately before the pass of the corresponding pass number. A unit of the amount of paper feeding is a pixel.

An amount of paper feeding immediately before the first pass is a large amount of feeding corresponding to 603 pixels due to so-called cueing, but an amount of paper feeding immediately before each pass after the second pass repeats 10 pixels and 11 pixels. For example, an amount of feeding in the paper feeding executed after the first pass ends and before the second starts is 10 pixels. For that reason, as compared to a position of the nozzle 20 with the nozzle number 32 in the first pass, a position of the nozzle 20 with the same nozzle number 32 in the second pass is shifted upstream by 10 pixels. Of course, during printing, the nozzle rows 26 do not move upstream between passes, but the medium 30 is fed downstream, and thus the illustrated correspondence relationship between each nozzle 20 and each raster line in the sub-scanning direction D2 is realized for each pass.

The pixel positions illustrated in FIG. 4 are pixel positions to be printed in the corresponding pass. Here, the pixel position of 1 indicates odd-numbered pixel positions in a raster line, and the pixel position of 2 indicates even-numbered pixel positions in the raster line. The pixel positions for each pass are repeated in a fixed pattern of 1, 2, 2, 1, 1, 2, 2, 1, 1, and so forth. Accordingly, according to FIG. 4, in the raster line with the raster number #30, dots of each pixel at the pixel position of 2 are formed by the nozzle 20 with the nozzle number 26 in the third pass, and dots of each pixel at the pixel position of 1 are formed by the nozzle 20 with the nozzle number 13 in the eighth pass. Similarly, in the raster line with the raster number #31, dots of each pixel at the pixel position of 2 are formed by the nozzle 20 with the nozzle number 29 in the second pass, and dots of each pixel at the pixel position of 1 are formed by the nozzle 20 with the nozzle number 21 in the fifth pass. The above is the description of the specific example of the printing rule.

The nozzle 20 with the nozzle number 33 illustrated in gray in FIG. 4 is assumed to be a defective nozzle. That is, according to the defective nozzle information, it is written that the nozzle 20 with the nozzle number 33 is a defective nozzle. In this case, each of the raster lines with the raster numbers #37, #47, and #58 corresponds to a "defective raster line" formed using the plurality of nozzles 20 including the defective nozzle. These defective raster lines are not continuous with each other. That is, the defective raster lines are not adjacent to each other in the sub-scanning direction D2. Accordingly, when the nozzle 20 with the nozzle number 33 is the defective nozzle as in the example of FIG. 4, the missing dots are not adjacent to each other in the sub-scanning direction D2, and thus the control unit 11 determines "No" in step S120 and proceeds to step S130. Also, a raster line that does not correspond to a defective raster line, that is, a raster line formed using a plurality of nozzles 20 that do not include a defective nozzle, is referred to as a "normal raster line".

On the other hand, in FIG. 4, in addition to the nozzle number 33, the nozzle 20 with the nozzle number 25 surrounded by a thick line is also assumed to be a defective nozzle. In this case, each of the raster lines with the raster numbers #36, #37, #47, #57, and #58 corresponds to a defective raster line, the defective raster lines with the raster numbers #36 and #37 are adjacent to each other, and the defective raster lines with the raster numbers #57 and #58 are also adjacent to each other. Further, the pixel position of the nozzle 20 with the nozzle number 25 for forming the defective raster line with the raster number #36 and the pixel position of the nozzle 20 with the nozzle number 33 for forming the defective raster line with the raster number #37 are both 1, that is, odd-numbered pixel positions, and thus the missing dots are adjacent to each other in the sub-scanning direction D2. In addition, the pixel position of the nozzle 20 with the nozzle number 25 for forming the defective raster line with the raster number #57 and the pixel position of the nozzle 20 with the nozzle number 33 for forming the defective raster line with the raster number #58 are both 2, that is, even-numbered pixel positions, and thus the missing dots are adjacent to each other in the sub-scanning direction D2. Accordingly, when the nozzles 20 with the nozzle numbers 25 and 33 are the defective nozzles, the control unit 11 determines "Yes" in step S120 and proceeds to step S140.

As described above, when the two nozzles 20 with the nozzle numbers 25 and 33 are the defective nozzles, for example, the nozzle 20 with the nozzle number 25 can be understood as a "first defective nozzle", and the nozzle 20 with the nozzle number 33 can be understood as a "second defective nozzle". Also, a normal nozzle responsible for forming one raster line together with the first defective nozzle, for example, the nozzle 20 with the nozzle number 17 can be referred to as a "first normal nozzle", and a normal nozzle responsible for forming one raster line together with the second defective nozzle, for example, the nozzle 20 with the nozzle number 20 can be referred to as a "second normal nozzle". In addition, the defective raster line with the raster number #36 can be understood as an example of a "first raster line" formed at the medium 30 using two or more nozzles 20 including the first defective nozzle which is one of the defective nozzles and the first normal nozzle which is one of the normal nozzles, and the defective raster line with the raster number #37 can be understood as an example of a "second raster line" formed at the medium 30 using two or more nozzles 20 including the second defective nozzle which is one of the defective nozzles and the second normal nozzle which is one of the normal nozzles.

The normal printing in step S130 will be described later.

The normal printing is printing in accordance with the print data generated in step S100 and the above-described printing rule. Also, in the present embodiment, in both the normal printing in step S130 and the printing with the first control in step S140, the control unit 11 executes the neighborhood complementation depending on presence of the defective nozzle. Neighborhood complementation is processing of converting a size of a dot at a position adjacent to a missing dot into a larger size and discharging the dot. The conversion into a larger size is, for example, conversion from dot-off to small dot-on, conversion from small dot-on to medium dot-on, or conversion from medium dot-on to large dot-on. In addition, the conversion into a larger size may be processing of uniformly converting dots into the largest large dot even if a state before conversion is dot-off and regardless of the size of the dots.

Figure 5:
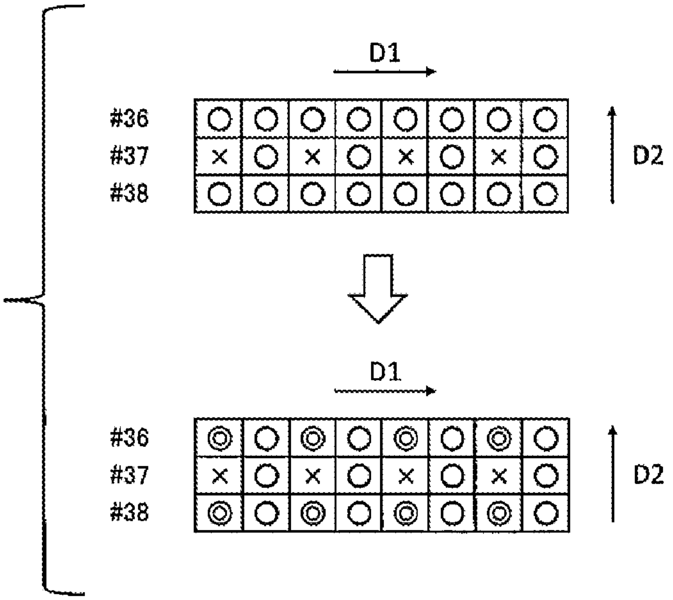
FIG. 5 is a diagram for describing normal printing in step S130.

FIG. 5 is a diagram for describing the normal printing and illustrates some of the print data extracted. Specifically, three raster lines with the raster numbers #36, #37, and #38 are illustrated in the upper and lower parts of FIG. 5, the upper part is print data before neighborhood complementation, and the lower part is print data after neighborhood complementation. The raster line with the raster number #37 is the defective raster line. In FIG. 5, each rectangle is each pixel, and a circle in a pixel means that medium dot-on is defined for the pixel. Further, a double circle in a pixel means that large dot-on is defined for the pixel.

In FIG. 5 and FIGS. 6A, 6B, and 7, which will be described later, in order to make the description easier to understand, it is assumed that medium-dot-on is defined for all pixels at the time of the print data generated in step S100. However, an x mark is written inside a pixel corresponding to a missing dot.

The upper part of FIG. 5 will be referred to. As can be understood from the description of FIG. 4, in accordance with the printing rule, in the normal raster line with the raster number #36, dots of each odd-numbered pixel are formed by the nozzle 20 with the nozzle number 25 in the fourth pass, and each dot of each even-numbered pixel is formed by the nozzle 20 with the nozzle number 17 in the seventh pass. In addition, in the defective raster line with the raster number #37, each dot of each odd-numbered pixel becomes a missing dot due to the defective nozzle with the nozzle number 33 in the first pass, and each dot of each even-numbered pixel is formed by the nozzle 20 with the nozzle number 20 in the sixth pass. Further, in the normal raster line with the raster number #38, each dot of each even-numbered pixel is formed by the nozzle 20 with the nozzle number 28 in the third pass, and each dot of each odd-numbered pixel is formed by the nozzle 20 with the nozzle number 15 in the eighth pass.

In such a situation, the control unit 11 performs the neighborhood complementation. Specifically, the dots of each odd-numbered pixel in the normal raster line with the raster number #36 and the dots of each odd-numbered pixel in the normal raster line with the raster number #38 are adjacent to the missing dots, which are the dots of each odd-numbered pixel in the defective raster line with the raster number #37, in the sub-scanning direction D2. For that reason, as illustrated in the lower part of FIG. 5, the control unit 11 performs processing of converting the current medium dots to large dots on the print data for the dots of each odd-numbered pixel in the normal raster line with the raster number #36 and the dots of each odd-numbered pixel in the normal raster line with the raster number #38. By executing printing based on the print data subjected to such neighborhood interpolation, the missing dots are hardly conspicuous in the print result of the image on the medium 30, and the print quality is maintained.

Next, the printing with the first control in step S140 will be described.

The first control is processing of executing either control of replacing positions of dots to be discharged by the first defective nozzle in the main scanning direction D1 with positions of dots to be discharged by the first normal nozzle in the main scanning direction D1 and then converting sizes of dots adjacent in the sub-scanning direction D2 to the dots to be discharged by the first defective nozzle or the dots to be discharged by the second defective nozzle to larger sizes, or control of replacing positions of dots to be discharged by the second defective nozzle in the main scanning direction D1 with positions of dots to be discharged by the second normal nozzle in the main scanning direction D1 and then converting the sizes of the dots adjacent in the sub-scanning direction D2 to the dots to be discharged by the first defective nozzle or the dots to be discharged by the second defective nozzle to larger sizes.

Figure 6A:
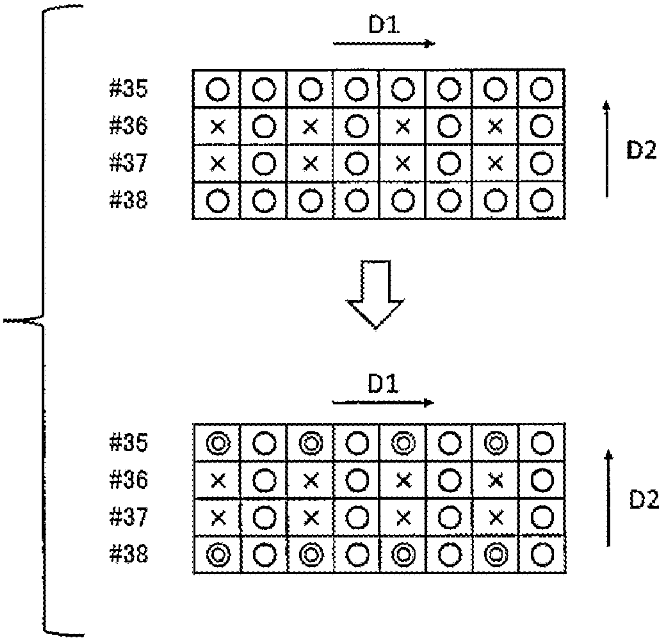
FIG. 6A is a diagram for describing normal printing when executed after "Yes" in step S120.
Figure 6B:
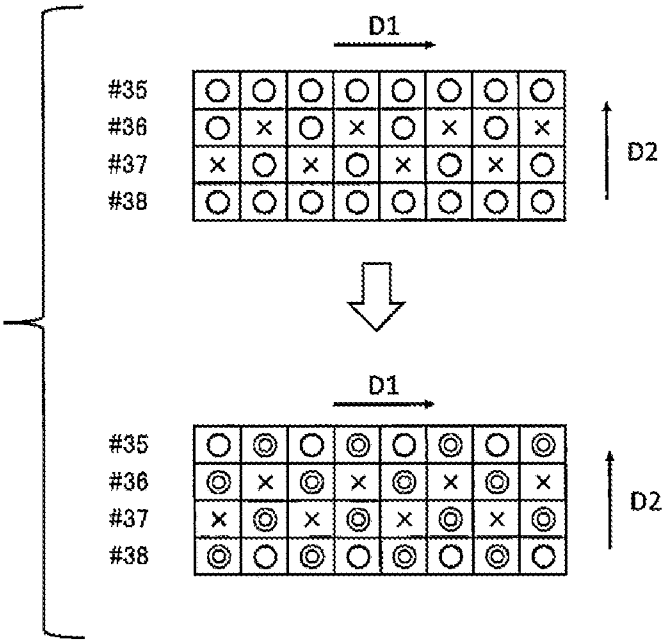
FIG. 6B is a diagram for describing printing accompanied by first control in step S140.

FIG. 6A is a diagram illustrating a case in which the normal printing is performed without executing the first control when "Yes" is determined in step S120, and specifically illustrates a problem assumed in the present embodiment. On the other hand, FIG. 6B is a diagram for describing the printing with the first control. In both FIGS. 6A and 6B, some of the print data, specifically, four raster lines with raster numbers #35, #36, #37, and #38 are extracted and illustrated, and the views of FIGS. 6A and 6B are the same as the views of FIG. 5. In FIGS. 6A and 6B, naturally, the two raster lines with the raster numbers #36 and #37 are defective raster lines and correspond to the first raster line and the second raster line.

The upper part of FIG. 6A will be referred to. As can be understood from the description of FIG. 4, in accordance with the printing rule, in the normal raster line with the raster number #35, the dots of each even-numbered pixel are formed by the nozzle 20 with the nozzle number 30 in the second pass, and the dots of each odd-numbered pixel are formed by the nozzle 20 with the nozzle number 22 in the fifth pass. Also, in the defective raster line with the raster number #36, each dot of each odd-numbered pixel becomes a missing dot due to the defective nozzle with the nozzle number 25 in the fourth pass, and each dot of each even-numbered pixel is formed by the nozzle 20 with the nozzle number 17 in the seventh pass. In addition, in the defective raster line with the raster number #37, each dot of each odd-numbered pixel becomes a missing dot due to the defective nozzle with the nozzle number 33 in the first pass, and each dot of each even-numbered pixel is formed by the nozzle 20 with the nozzle number 20 in the sixth pass. Further, in the normal raster line with the raster number #38, each dot of each even-numbered pixel is formed by the nozzle 20 with the nozzle number 28 in the third pass, and each dot of each odd-numbered pixel is formed by the nozzle 20 with the nozzle number 15 in the eighth pass.

That is, as illustrated in the upper part of FIG. 6A, the first raster line and the second raster line are adjacent to each other, and thus the missing dots in the first raster line and the missing dots in the second raster line are aligned in the main scanning direction D1, resulting in a large missing dot area in which two missing dots are combined in the sub-scanning direction D2. As illustrated in the lower part of FIG. 6A, even if the neighborhood complementation is performed to convert the dots adjacent to the missing dots in the sub-scanning direction D2 into larger sizes, such a missing dot area is difficult to fill with ink sufficiently, resulting in deterioration in print quality.

To solve such a problem, the control unit 11 replaces the positions of the dots to be discharged by the first defective nozzle in the main scanning direction D1 with the positions of the dots to be discharged by the first normal nozzle in the main scanning direction D1 for the defective raster line of the raster number #36, which is the first raster line. According to the printing rule, the pixel position for each pass has a cycle of 1, 2, 2, 1, 1, 2, 2, 1, 1, and so forth in order from the first pass, but in the first control, the defective raster line to be subjected to position replacement has a cycle of 1, 2, 1, 2, 1, 2, 1, 2, and so forth, for example. Position replacement processing is processing of changing the passes or the nozzles 20 to which data of the pixels of the print data is assigned.

Due to such position replacement, in the defective raster line with the raster number #36, as illustrated in the upper part of FIG. 6B, each dot of each even-numbered pixel becomes a missing dot due to the defective nozzle with the nozzle number 25 in the fourth pass, and each dot of each odd-numbered pixel is formed by the nozzle 20 with the nozzle number 17 in the seventh pass. That is, due to the position replacement, the positions of the missing dots in the first raster line and the missing dots in the second raster line are not aligned in the main scanning direction D1, and a large missing dot area as illustrated in FIG. 6A does not occur. Instead of setting the defective raster line with the raster number #36 as a target of the position replacement, the control unit 11 may replace the positions of the dots to be discharged by the second defective nozzle in the main scanning direction D1 and the positions of the dots to be discharged by the second normal nozzle in the main scanning direction D1 for the defective raster line with the raster number #37, which is the second raster line.

In this way, the control unit 11 performs the neighborhood complementation after performing the position replacement for either the first raster line or the second raster line adjacent to each other. Specifically, as illustrated in the lower part of FIG. 6B, for the dots of each pixel adjacent in the sub-scanning direction D2 to either the missing dots in the defective raster line with the raster number #36 or the missing dots in the defective raster line with the raster number #37, processing of converting the current medium dots to large dots is performed on the print data. By executing printing based on the print data that has undergone the position replacement and the neighborhood complementation, the missing dots are hardly conspicuous in the print result of the image at the medium 30, and the print quality is maintained.

FIG. 6B illustrates only the defective raster lines with the raster numbers #36 and #37 as specific examples of the first raster line and the second raster line. In the printing with the first control, it goes without saying that, as with the defective raster lines with the raster numbers #57 and #58 illustrated in FIG. 4, the neighborhood complementation is similarly performed for other adjacent first raster lines and second raster lines after either one is set as a target of the position replacement.

3. First Modified Example

Figure 7:
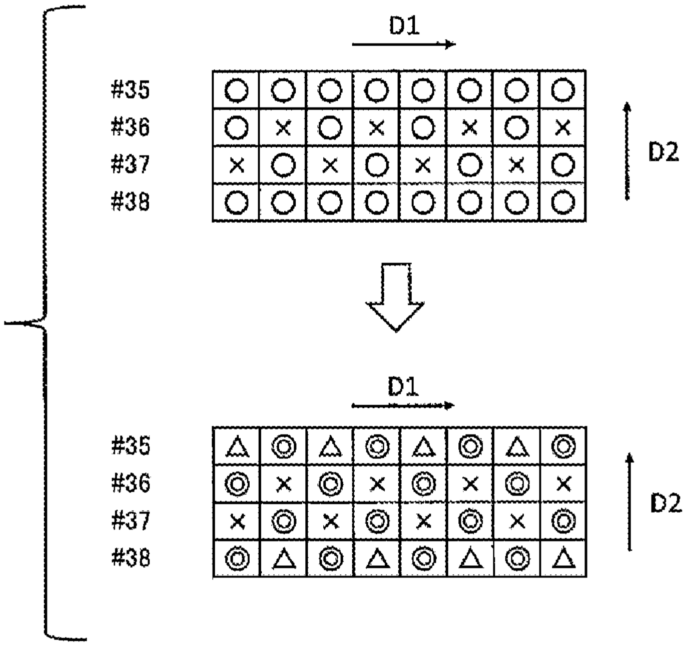
FIG. 7 is diagram for describing a first modified example.

FIG. 7 is a diagram for describing printing with the first control and illustrates a modified example of FIG. 6B. FIG. 7 and the description related to FIG. 7 are also referred to as a first modified example. In the first modified example, when a normal raster line formed using two or more normal nozzles not including a defective nozzle, which is a raster line formed at the medium 30 adjacent to a raster line formed at the medium 30 using two or more nozzles 20 including a defective nozzle and a normal nozzle, is formed in the first control, the control unit 11 converts the size of dots not targeted for conversion to a larger size in the normal raster line, into a smaller size. The conversion to a smaller size is, for example, conversion from small dot-on to dot-off, conversion from medium dot-on to small dot-on, and conversion from large dot-on to medium dot-on. Also, the conversion into a smaller size may be processing of uniformly converting a dot into the smallest small dot or dot-off regardless of the size of the dot before the conversion.

A difference of FIG. 7 from FIG. 6B will be described. The upper part of FIG. 7 and the upper part of 6B are exactly the same. A triangle in a pixel illustrated in the lower part of FIG. 7 means that a small dot-on is defined for the pixel. Of the raster lines illustrated in FIG. 7, raster numbers #35 and #38 are normal raster lines. As already described, of the pixels of these normal raster lines, for the pixels at positions adjacent to the missing dots in the defective raster lines with the raster numbers #36 and #37, conversion into dots having larger sizes is performed. Further, the control unit 11 performs processing of converting current medium dots into small dots on the print data for the dots not to be converted into larger size dots, that is, pixels at positions not adjacent to the missing dots in the sub-scanning direction D2, of the pixels of the normal raster lines. In this way, in the normal raster lines, by converting the size of the dots not targeted for conversion into the large size, to the smaller size, it is possible to inhibit variations in the amount of ink in all the normal raster lines.

4. Second Modified Example

In the embodiments and the first modified example described above, in the overlap printing in which one raster line is formed by two nozzles 20 regardless of whether the raster line is a normal raster line or a defective raster line, half of the pixels forming one raster line are assigned to each of the two nozzles 20, and a usage rate between the two nozzles 20 is 50% to 50%. A usage rate of a nozzle 20 is a rate of the number of pixels assigned as data and is not a ratio of the number of dots actually discharged to the medium 30. On the other hand, in a second modified example, when a raster line is formed at the medium 30 using two or more nozzles 20 including a defective nozzle and a normal nozzle, the control unit 11 is configured to execute "second control" of making a usage rate of the normal nozzle greater than that of the defective nozzle and causing the normal nozzle to discharge at least some of dots to be discharged by the defective nozzle.

That is, in the second control, a usage rate between the defective nozzle and the normal nozzle becomes unbalanced in formation of the defective raster line, and the usage rate between the defective nozzle and the normal nozzle is set to, for example, 0% to 100%, 20% to 80%, or 40% to 60%. Thus, if the usage rate is 50% to 50%, it is possible to cause the normal nozzle to discharge all or some of the dots that should have been discharged by the defective nozzle. Since the defective nozzle cannot actually discharge dots even if pixels are assigned, it is possible to reduce the number of missing dots in the defective raster line by executing the second control.

However, depending on capability of the printing head 19, it may not be possible to assign more than half of the pixels in one raster line to one nozzle 20 for printing. For example, it is assumed that a print resolution in the main scanning direction D1 set when the print data is generated is 1200 dpi, and the maximum print resolution that can be realized by one nozzle 20 in one pass is 600 dpi. In this case, since the print data is generated in accordance with the set 1200 dpi, more than half of the pixels in one raster line cannot be assigned to one nozzle 20. On the other hand, if the print resolution in the main-scanning direction D1 set when the print data is generated is equal to or less than 600 dpi, all pixels in one raster line can be assigned to one nozzle 20. Thus, when the set print resolution is equal to or less than a predetermined resolution, the control unit 11 executes the second control instead of the first control.

Figure 8:
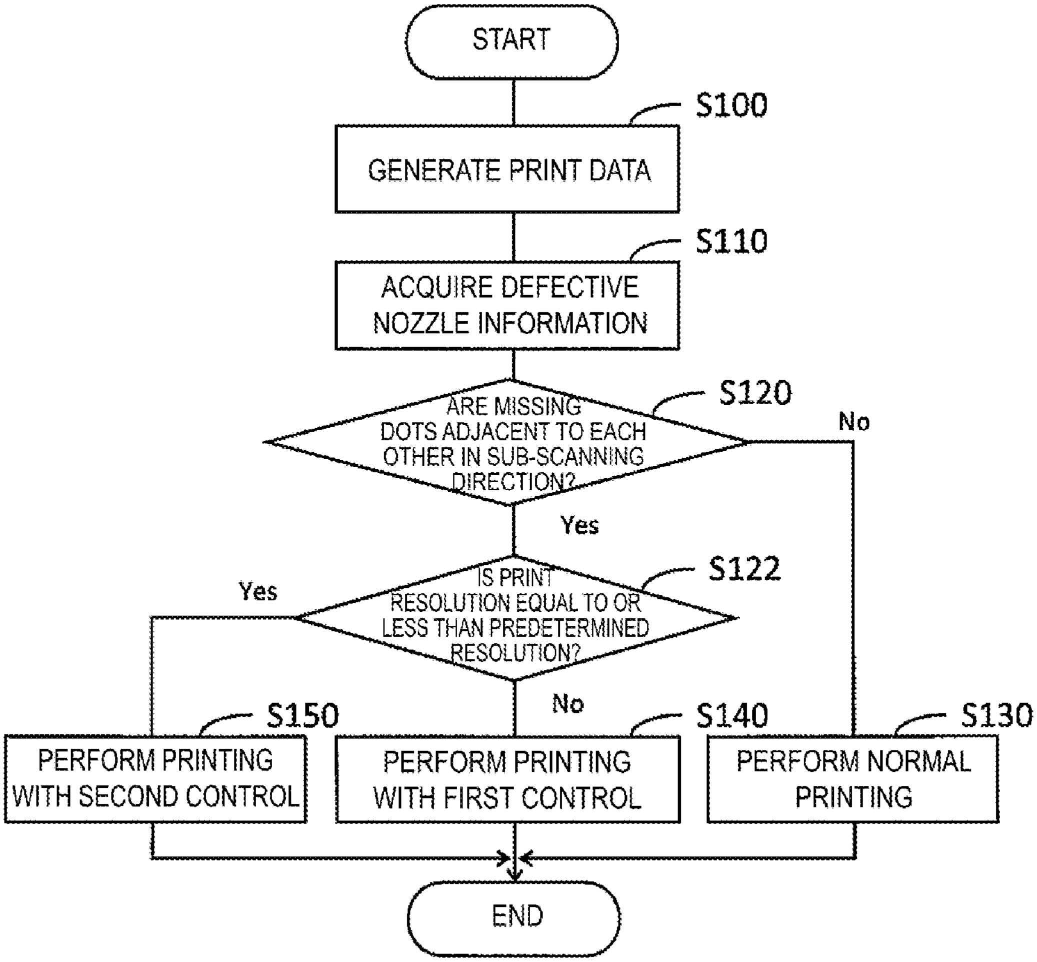
FIG. 8 is a flowchart illustrating processing according to a second modified example.

FIG. 8 is a flowchart illustrating processing according to the second modified example of the present embodiment. FIG. 8 is different from the flowchart of FIG. 3 in that FIG. 8 includes steps S122 and S150. After determining "Yes" in step S120, the control unit 11 determines whether the set print resolution is equal to or less than the predetermined resolution in step S122, proceeds from the determination of "Yes" to step S150 if the resolution is equal to or less than the predetermined resolution, or proceeds from determination of "No" to step S140 if the resolution is not equal to or less than the predetermined resolution. Here, attention will be paid to the print resolution in the main scanning direction D1.

The print resolution is set through the user's operation of the operation receiving unit 14 or the like before the print data is generated in step S100, and print data having the resolutions corresponding to this setting is generated in step S100. That is, the user can set the print resolution through a user interface (hereinafter referred to as UI) provided by the display unit 13 and the operation receiving unit 14. Referring to the above-described specific example, if the print resolution is equal to or less than 600 dpi, the control unit 11 determines "Yes" in step S122 and proceeds to step S150. In step S150, the control unit 11 executes printing with the second control. Also, in step S150, the control unit 11 performs printing by controlling the transport unit 17, the carriage 18, and the printing head 19 in accordance with the print data and the printing rule. However, defective raster lines are exceptionally set as targets of the second control, and for example, all pixels forming the raster lines are assigned to normal nozzles.

As a result, in the defective raster line such as the first raster line or the second raster line, all the dots in the raster line including the dots that should have been assigned to the defective nozzle when following the printing rule are discharged by the normal nozzle, and no missing dots are generated. Alternatively, in the second control, for the defective raster line, the control unit 11 may assign, for example, 20% of the pixels forming the raster line to the defective nozzle and 80% of the pixels forming the raster line to the normal nozzle. Even in this case, in the defective raster line, some of the dots that should have been assigned to the defective nozzle when following the printing rule are discharged by the normal nozzle, and the number of generated missing dots is reduced.

Of course, the control unit 11 can execute the neighborhood complementation in step S150 as well. That is, if a missing dot is generated due to a defective nozzle in a certain raster line, printing may be executed after performing processing of converting a size of a dot at a position adjacent to the missing dot in the sub-scanning direction D2 into a larger size on the print data.

5. Third Modified Example

Also in a third modified example, similarly to the second modified example, the control unit 11 can execute the second control when a defective raster line is formed. However, in the third modified example, the set print resolution is not considered when the first control or the second control is selected. For example, even if the maximum print resolution that can be achieved by one nozzle 20 in one pass is 600 dpi at a normal moving speed of the carriage 18, the maximum print resolution that can be achieved by one nozzle 20 in one pass can be doubled to 1200 dpi if a moving speed of the carriage 18 is set to ½ of the normal moving speed.

For that reason, in the third modified example, it is assumed that the printing head 19 has the ability to print all pixels of a raster line with one nozzle 20 in one pass in correspondence with any of print resolutions which can be set by the user through the UI. In addition, the control unit 11 receives selection of either the first control or the second control, and executes either the first control or the second control in accordance with the received selection.

Figure 9:
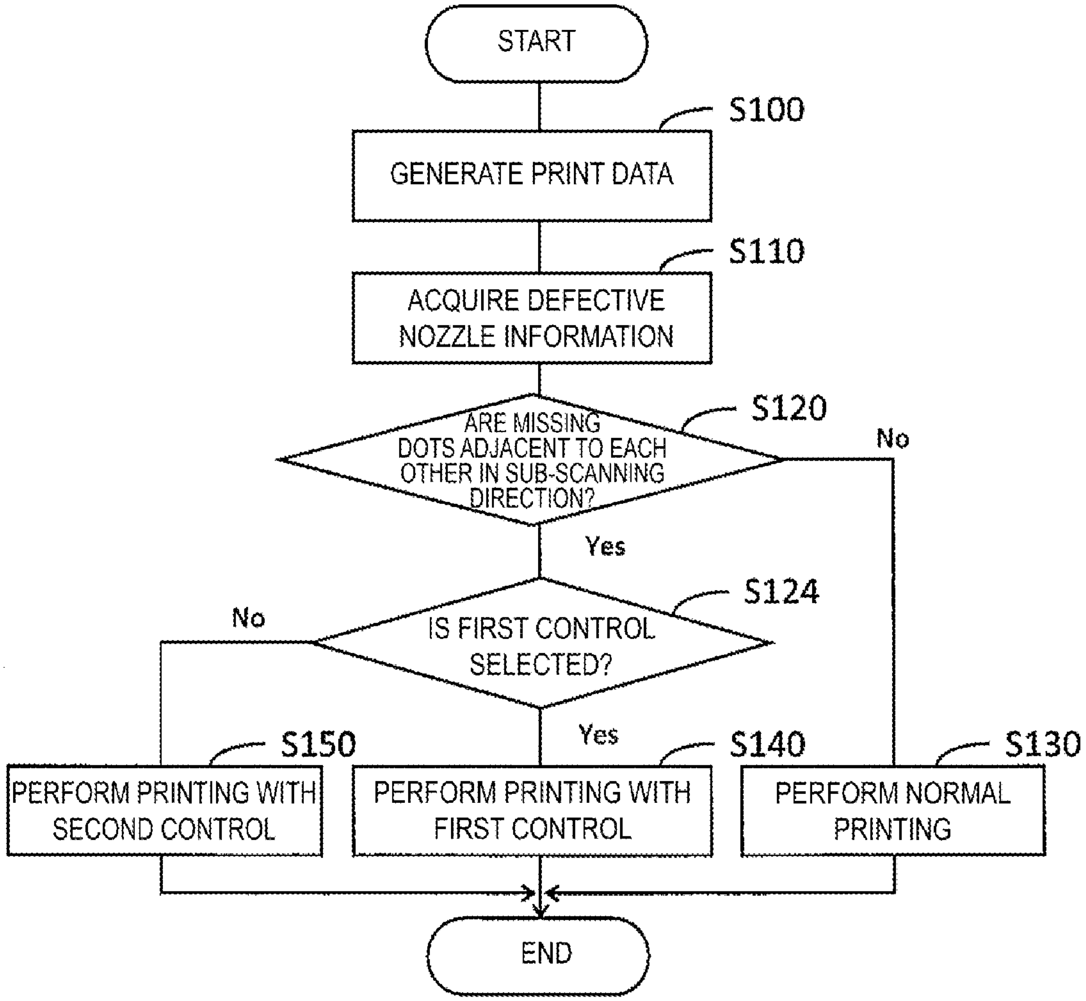
FIG. 9 is a flowchart illustrating processing according to a third modified example.

FIG. 9 is a flowchart illustrating processing according to the third modified example of the present embodiment. FIG. 9 is different from the flowchart of FIG. 3 in that FIG. 9 includes steps S124 and S150. Further, in FIG. 9, step S124 is executed instead of step S122 in FIG. 8. After the determination of "Yes" in step S120, the control unit 11 determines whether the first control is selected in step S124, proceeds from the determination of "Yes" to step S140 if the first control is selected, or proceeds from determination of "No" to step S150 if the second control is selected.

Through the UI, the user selects in advance which of the first control and the second control is to be executed as a countermeasure against the defective raster line. This selection result is recognized by the control unit 11. For that reason, the control unit 11 performs the determination of step S124 in accordance with the selection of the first control or the second control by the user.

6. Summary

As described above, according to the present embodiment, the printing device 10 includes the printing head 19 including the nozzle row 26 in which the plurality of nozzles 20 each configured to discharge a dot of liquid to the medium 30 are arranged in the sub-scanning direction D2, the printing head 19 being configured to discharge the dot while moving in the main scanning direction D2 intersecting the sub-scanning direction D1, the storage unit 16 configured to store the information about defective nozzles of the plurality of nozzles 20 forming the nozzle row 26, and the control unit 11 configured to control the printing head 19. In addition, of raster lines having the length component in the main scanning direction D1, the raster line formed at the medium 30 using two or more nozzles 20 including the first defective nozzle that is one of the defective nozzles and the first normal nozzle that is one of normal nozzles, the normal nozzles being included in the plurality of nozzles 20 and not corresponding to the defective nozzles, is defined as the first raster line, the raster line formed at the medium 30 using two or more nozzles 20 including the second defective nozzle that is one of the defective nozzles and the second normal nozzle that is one of the normal nozzles is defined as the second raster line, and when the dot to be discharged by the first defective nozzle and the dot to be discharged by the second defective nozzle are determined to be adjacent to each other in the sub-scanning direction D2, the control unit 11 performs the first control of executing either the control of replacing the position of the dot to be discharged by the first defective nozzle in the main scanning direction D1 with the position of the dot to be discharged by the first normal nozzle in the main scanning direction D1 and then converting the size of the dot adjacent in the sub-scanning direction D2 to the dot to be discharged by the first defective nozzle or the dot to be discharged by the second defective nozzle into a larger size, or the control of replacing the position of the dot to be discharged by the second defective nozzle in the main scanning direction D1 with the position of the dot to be discharged by the second normal nozzle in the main scanning direction D1 and then converting the size of the dot adjacent in the sub-scanning direction D2 to the dot to be discharged by the first defective nozzle or the dot to be discharged by the second defective nozzle into a larger size.

According to the above configuration, the printing device 10 executes the first control when the dot to be discharged by the first defective nozzle and the dot to be discharged by the second defective nozzle are determined to be adjacent to each other in the sub-scanning direction D2. Thus, the problem of the missing dots can be appropriately resolved by making them inconspicuous in the print result, and deterioration of the print quality due to the defective nozzles can be prevented.

Also, according to the present embodiment, when, adjacently to the raster line formed at the medium 30 using two or more nozzles 20 including the defective nozzle and the normal nozzle, a normal raster line is formed at the medium 30 in the first control, the normal raster line being the raster line formed using two or more normal nozzles not including a defective nozzle, the control unit 11 may convert the size of the dot not targeted for conversion to the large size in the normal raster line, into a smaller size.

According to the above configuration, by reducing the size of the dot that does not correspond to the dot to be converted into the larger size for the neighborhood complementation, it is possible to inhibit an increase or decrease in the overall amount of liquid in the normal raster line, thereby inhibiting a variation in the image quality of the print result.

Also, according to the present embodiment, in a case in which the raster line is formed at the medium 30 using two or more nozzles 20 including the defective nozzle and the normal nozzle, the control unit 11 may execute the second control of making the usage rate of the normal nozzle greater than that of the defective nozzle and causing the normal nozzle to discharge at least some of the dots to be discharged by the defective nozzle, and perform the second control instead of the first control when the set print resolution is equal to or less than a predetermined resolution.

According to the above configuration, by performing the second control instead of the first control when the defective raster line is formed, it is possible to reduce the number of missing dots and further improve the image quality. In addition, since position replacement is not performed, reduction in memory consumption required for the processing and an effect of shortening a processing time are also expected. Further, since the condition that the set print resolution is equal to or less than the predetermined resolution is applied, there is no need to reduce the moving speed of the printing head 19 in order to increase the usage rate of the normal nozzle, and a decrease in printing throughput is not caused.

Also, according to the present embodiment, when the raster line is formed at the medium 30 using two or more nozzles 20 including the defective nozzle and the normal nozzle, the control unit 11 may perform the second control of making the usage rate of the normal nozzle greater than that of the defective nozzle and causing the normal nozzle to discharge at least some of the dots to be discharged by the defective nozzle, and receive the selection of either the first control or the second control and execute either the first control or the second control in accordance with the received selection.

According to the above configuration, it is possible to cause the user to select which of the first control and the second control is to be executed, and execute the first control or the second control in accordance with the user's request.

In addition to the printing device 10, the present embodiment discloses the printing method and the program 12 for executing the printing method in cooperation with a processor.

For example, disclosed is the printing method including performing printing by controlling the printing head 19 including the nozzle row 26 in which the plurality of nozzles 20 each configured to discharge a dot of liquid to the medium 30 are arranged in the sub-scanning direction D2, the printing head 19 being configured to discharge the dot while moving in the main scanning direction D1 intersecting the sub-scanning direction D2, wherein of raster lines having the length component in the main scanning direction D1, the raster line formed at the medium 30 using two or more nozzles 20 including the first defective nozzle that is one of defective nozzles of the plurality of nozzles 20 forming the nozzle row 26 and the first normal nozzle that is one of normal nozzles, the normal nozzles being included in the nozzles 20 and not corresponding to the defective nozzles, is defined as the first raster line, the raster line formed at the medium 30 using two or more nozzles 20 including the second defective nozzle that is one of the defective nozzles and the second normal nozzle that is one of the normal nozzles is defined as the second raster line, and in the printing, when the dot to be discharged by the first defective nozzle and the dot to be discharged by the second defective nozzle are determined to be adjacent to each other in the sub-scanning direction D2, the first control of executing either the control of replacing the position of the dot to be discharged by the first defective nozzle in the main scanning direction D1 with the position of the dot to be discharged by the first normal nozzle in the main scanning direction D1 and then converting the size of the dot adjacent in the sub-scanning direction D2 to the dot to be discharged by the first defective nozzle or the dot to be discharged by the second defective nozzle into a larger size, or the control of replacing the position of the dot to be discharged by the second defective nozzle in the main scanning direction D1 with the position of the dot to be discharged by the second normal nozzle in the main scanning direction D1 and then converting the size of the dot adjacent in the sub-scanning direction D2 to the dot to be discharged by the first defective nozzle or the dot to be discharged by the second defective nozzle into a larger size is performed.

Three or more nozzles 20 may be used to form one raster line. For example, a printing rule in which one raster line is formed by three different nozzles 20 is adopted. Then, if one of the three nozzles 20 for forming one raster line is a defective nozzle and the remaining two nozzles 20 are normal nozzles, the one raster line corresponds to a defective raster line. Further, there may be a plurality of the first normal nozzles for forming the first raster line corresponding to the defective raster line and a plurality of the second normal nozzles for forming the second raster line corresponding to the defective raster line. When there are a plurality of the first normal nozzles for one first raster line, the control unit 11 replaces the positions of the dots to be discharged by the first defective nozzle with positions of dots to be discharged by any one of the first normal nozzles. Alternatively, when there are a plurality of the second normal nozzles for one second raster line, the control unit 11 replaces the positions of the dots to be discharged by the second defective nozzle with positions of dots to be discharged by any one of the second normal nozzles.

The relative movement between the medium 30 and the printing head 19 in the sub-scanning direction D2 performed by the transport unit 17 may be upstream movement of the printing head 19 including the carriage 18 in the sub-scanning direction D2. That is, the transport unit 17 may be understood to include a mechanism for moving the printing head 19 including the carriage 18 upstream in the sub-scanning direction D2.

What is claimed is:

1. A printing device comprising:

a printing head including a nozzle row in which a plurality of nozzles each configured to discharge a dot of liquid to a medium are arranged in a sub-scanning direction, the printing head being configured to discharge the dot while moving in a main scanning direction intersecting the sub-scanning direction;

a storage unit configured to store information about defective nozzles of the plurality of nozzles forming the nozzle row; and a control unit configured to control the printing head, wherein of raster lines having a length component in the main scanning direction, the raster line formed at the medium using two or more nozzles of the plurality of nozzles, the two or more nozzles including a first defective nozzle that is one of the defective nozzles and a first normal nozzle that is one of normal nozzles, the normal nozzles being included in the plurality of nozzles and not corresponding to the defective nozzles, is defined as a first raster line, the raster line formed at the medium using two or more nozzles of the plurality of nozzles, the two or more nozzles including a second defective nozzle that is one of the defective nozzles and a second normal nozzle that is one of the normal nozzles, is defined as a second raster line, and when the dot to be discharged by the first defective nozzle and the dot to be discharged by the second defective nozzle are determined to be adjacent to each other in the sub-scanning direction, the control unit performs first control of executing either control of replacing a position of the dot to be discharged by the first defective nozzle in the main scanning direction with a position of the dot to be discharged by the first normal nozzle in the main scanning direction and then converting a size of the dot adjacent in the sub-scanning direction to the dot to be discharged by the first defective nozzle or the dot to be discharged by the second defective nozzle into a larger size, or control of replacing a position of the dot to be discharged by the second defective nozzle in the main scanning direction with a position of the dot to be discharged by the second normal nozzle in the main scanning direction and then converting the size of the dot adjacent in the sub-scanning direction to the dot to be discharged by the first defective nozzle or the dot to be discharged by the second defective nozzle into a larger size.

2. The printing device according to claim 1, wherein when, adjacently to the raster line formed at the medium using two or more nozzles of the plurality of nozzles, the two or more nozzles including the defective nozzle and the normal nozzle, a normal raster line is formed at the medium in the first control, the normal raster line being the raster line formed using two or more of the normal nozzles not including the defective nozzle, the control unit converts a size of a dot not targeted for conversion to the large size in the normal raster line, into a smaller size.

3. The printing device according to claim 1, wherein in a case in which the raster line is formed at the medium using two or more nozzles of the plurality of nozzles, the two or more nozzles including the defective nozzle and the normal nozzle, the control unit is configured to perform second control of making a usage rate of the normal nozzle greater than that of the defective nozzle and causing the normal nozzle to discharge at least some of the dots to be discharged by the defective nozzle and the control unit performs the second control instead of the first control when a set print resolution is equal to or less than a predetermined resolution.

4. The printing device according to claim 1, wherein when the raster line is formed at the medium using two or more nozzles of the plurality of nozzles, the two or more nozzles including the defective nozzle and the normal nozzle, the control unit is configured to perform second control of making a usage rate of the normal nozzle greater than that of the defective nozzle and causing the normal nozzle to discharge at least some of the dots to be discharged by the defective nozzle and the control unit receives a selection of either the first control or the second control and performs either the first control or the second control in accordance with the received selection.

5. A printing method comprising performing printing by controlling a printing head including a nozzle row in which a plurality of nozzles each configured to discharge a dot of liquid to a medium are arranged in a sub-scanning direction, the printing head being configured to discharge the dot while moving in a main scanning direction intersecting the sub-scanning direction, wherein of raster lines having a length component in the main scanning direction, the raster line formed at the medium using two or more nozzles of the plurality of nozzles, the two or more nozzles including a first defective nozzle that is one of defective nozzles of the plurality of nozzles forming the nozzle row and a first normal nozzle that is one of normal nozzles, the normal nozzles being included in the plurality of nozzles and not corresponding to the defective nozzles, is defined as a first raster line, the raster line formed at the medium using two or more nozzles of the plurality of nozzles, the two or more nozzles including a second defective nozzle that is one of the defective nozzles and a second normal nozzle that is one of the normal nozzles, is defined as a second raster line, and in the printing, when the dot to be discharged by the first defective nozzle and the dot to be discharged by the second defective nozzle are determined to be adjacent to each other in the sub-scanning direction, first control of executing either control of replacing a position of the dot to be discharged by the first defective nozzle in the main scanning direction with a position of the dot to be discharged by the first normal nozzle in the main scanning direction and then converting a size of the dot adjacent in the sub-scanning direction to the dot to be discharged by the first defective nozzle or the dot to be discharged by the second defective nozzle into a larger size, or control of replacing a position of the dot to be discharged by the second defective nozzle in the main scanning direction with a position of the dot to be discharged by the second normal nozzle in the main scanning direction and then converting the size of the dot adjacent in the sub-scanning direction to the dot to be discharged by the first defective nozzle or the dot to be discharged by the second defective nozzle into a larger size is performed.

* * * * *